Oct. 7, 1969 C. S. McARTHUR 3,470,884
METHOD FOR MAKING FILTER TIP CIGARETTES
Original Filed Jan. 5, 1967 2 Sheets-Sheet 2
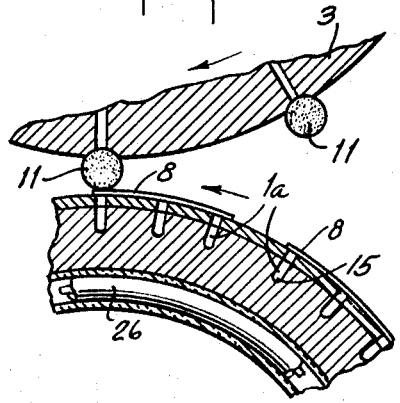
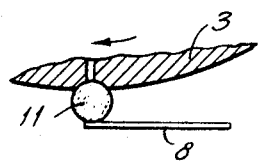
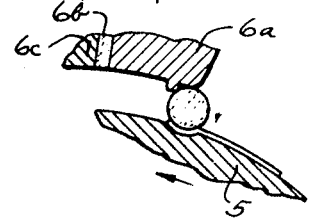
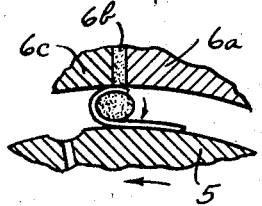
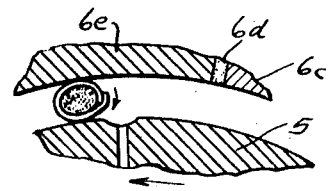
INVENTOR.
COLIN S. McARTHUR
BY Lester V. Clark
ATTORNEY 3,470,884
METHOD FOR MAKING FILTER TIP CIGARETTES
Colin S. McArthur, Winston-Salem, N.C., assignor to R. J. Reynolds Tobacco Company, Winston-Salem, N.C., a corporation of New Jersey
Original application Jan. 5, 1967, Ser. No. 607,539, now Patent No. 3,420,243, dated Jan. 7, 1969. Divided and this application Sept. 10, 1968, Ser. No. 758,801
Int. Cl. A24c 5/50, 5/58
U.S. Cl. 131—94                                 2 Claims

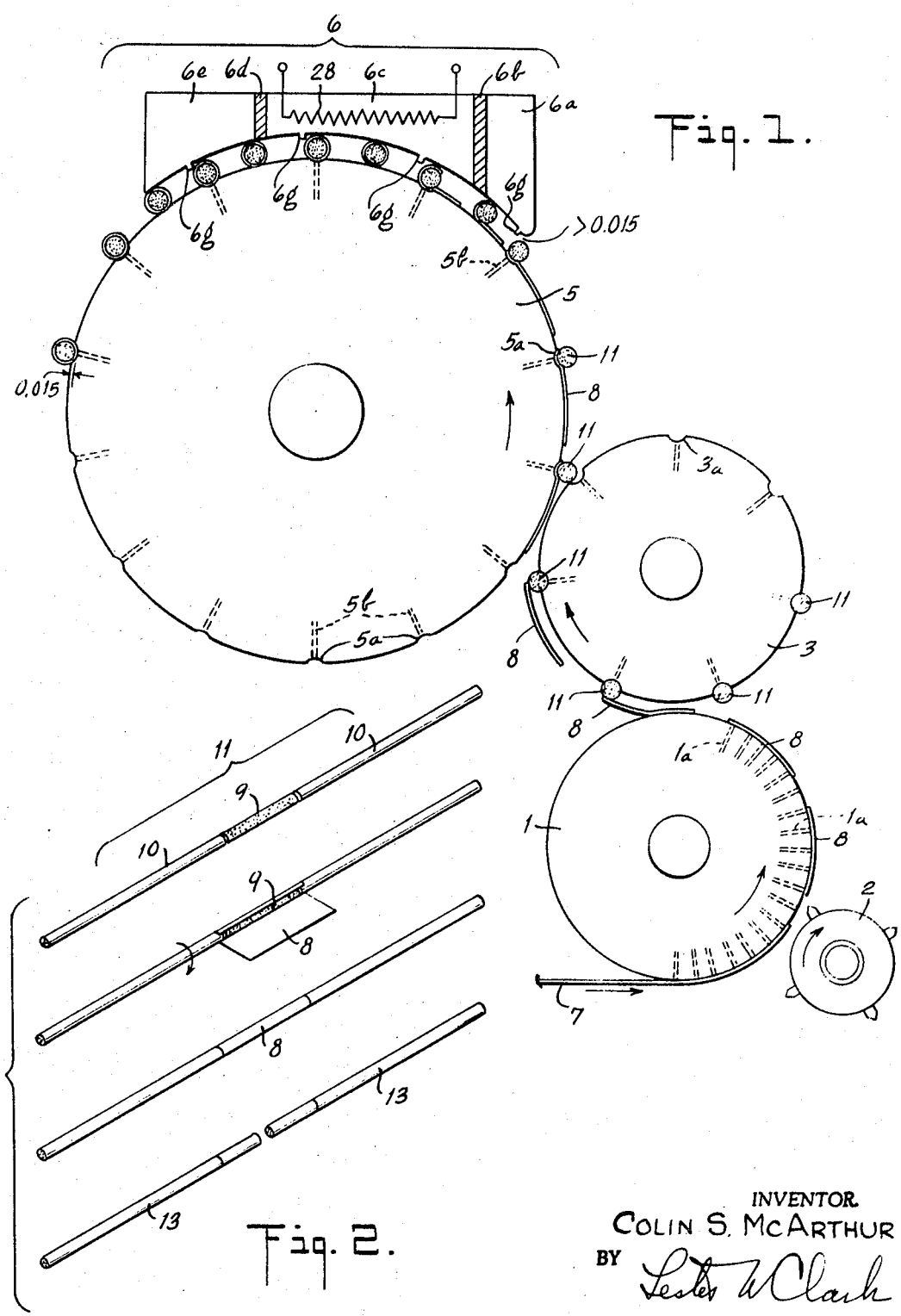

ABSTRACT OF THE DISCLOSURE

Method for covering assembled cigarette units (each comprising at least one cigarette rod section and at least one filter section) with patches of tipping material coated with heat-activatable adhesive. The patch is first heated, then its leading edge is applied to the assembled cool unit so as to span abutting ends of rod and filter sections. Local cooling of the adhesive completes the bond. The unit with the attached patch is then rolled for partial revolution while cool, then rolled for plural revolutions on a heated shoe which reactivates the adhesive, and finally rolled for a plural revolution on unheated shoe to set the adhesive.

Cross reference

This is a division of my copending application Ser. No. 607,539, filed Jan. 5, 1967, now U.S. Patent No. 3,420,243, entitled Apparatus for Making Filter Tip Cigarettes.

Background of the invention

In the manufacture of filter tip cigarettes, it has been the practice in the past to assemble a section of cigarette rod with a section of filter material, and to connect the two sections by wrapping around their abutting ends a patch of sheet material, commonly called tipping material. This tipping material is coated with a liquid bonding agent before it is wrapped around the cigarette unit, and the bond is set by drying the liquid bonding agent after the connection is completed. The handling of the tipping material coated with the liquid bonding agent entails some spilling of the bonding material, with the resultant necessity to stop the machine occasionally to clean up the spilled material.

There have been available for many years, a class of heat-activatable (or "heat-sealing") bonding materials, which are dry at room temperatures, but which are rendered tacky by heating to about 150°–200° F. These materials have not heretofore been used for manufacturing filter tip cigarettes, because the machinery of the prior art has not been adapted to heating the material before the bonding, and cooling it after the bonding. Furthermore, when such a bonding material is used, the bond is not secure until the bonding material is cooled. Consequently, there is a tendency for the bond to separate after it is initially formed, with the result that the finished cigarette is defective.

Summary of the invention

The present invention uses patches of tipping material coated with heat-activatable bonding material. It overcomes the difficulties encountered in the prior art by first tacking one edge of a heated patch of bonding material to an assembled cigarette and filter unit. This tacking is accomplished without any immediately following attempt to roll the cigarette and to wrap it in the tipping material. The cigarette then travels along an unheated path for a distance sufficient to cool the bonding material and allow the initial tack to set. Thereafter, the cigarette is rolled through a partial revolution so as to bring the initial tack to an angular position where it is out of alignment with a heating shoe that is next engaged by the cigarette and is effective to roll it through a plurality of revolutions, thereby heating the bonding material and making it tacky throughout the patch of tipping material. Finally, the cigarette is rolled over another unheated rolling shoe which is effective to cool the bonding material and set the bond.

Description of the drawing

FIG. 1 is a somewhat diagrammatic view illustrating the method of the invention;
FIG. 2 is a series of four successive perspective views of a cigarette unit as it is handled in the method of the invention;
FIG. 3 is an enlarged cross-sectional view showing the initial contact between the cigarette units on a transfer drum and the patches on the patch heating drum;
FIG. 4 is a view similar to FIG. 3, showing the cigarette unit with tack patch connected, moving along the transfer drum after separation from the heating drum;
FIG. 5 shows the assembled unit on the periphery of the rolling drum;
FIG. 6 is a view showing the cigarette on the periphery of the rolling drum as it moves into contact with the initial section of the rolling shoe;
FIG. 7 is a view similar to FIG. 6, but showing the cigarette as it passes the end of the initial section of the rolling shoe;
FIG. 8 is a view similar to FIG. 7, showing the movement of the cigarette as it passes under the heated section of the rolling shoe.

Detailed description

The apparatus illustrated in FIG. 1 includes a tipping material heating drum 1, a cutter 2, cooperating with that drum, a transfer drum 3 to which assembled filter cigarette units are supplied by conventional apparatus, not shown, a rolling drum 5 and a rolling shoe cooperating with the rolling drum and generally indicated at 6.

The tipping material is supplied as a strip or sheet, as illustrated at 7, and passes around the periphery of the heating drum 1. The material 7 is coated on its outer surface with a suitable heat-activatable bonding material, e.g., one of the vinyl acetate acrylic-copolymers. The drum 1 is provided with spaced apertures 1a which communicate with an evacuated chamber, and which are effective to hold the strip material 7 on the surface of the drum. The drum 1 cooperates with a cutter 2 which cuts the strip material into patches 8, each big enough to wrap a single cigarette. The drum 1 is operated at a peripheral speed slightly greater than the linear speed of the supply of the strip material 7 so that the patches 8 become separated on the surface of the drum 1, as shown. Each cigarette unit 11 typically consists of a double length filter section, as shown at 9 in FIG. 2 and two cigarette rod sections 10, with each cigarette rod section having one of its ends abutting an end of the filter section 9. The term "cigarette unit" as used in this specification is intended to be generic to: (a) such a double length unit; and (b) single length units as shown at 13.

The transfer drum 3 and the heater drum 1 are so mounted and spaced that each cigarette unit 11 which is held in a recess 3a by vacuum means on the periphery of the transfer drum 3 touches tangentially and with light pressure the leading edge of one of the patches 8 carried by the heater drum 1. At the same time, the apertures 1a under that leading edge pass out of communication with a vacuum manifold so that the tipping patch, whose heat-activatable bonding material has become tacky by the effect of the heat of the drum 1, sticks to the abutting cigarette unit along one elongated cylindrical element thereof. The patch is gradually released from the heater drum as the rotation of that drum and the transfer drum continues, so that the cigarette unit 11 continues with the periphery of the transfer drum 3, having the patch 8 attached thereto and following behind it. The transfer drum 3 cooperates tangentially with a rolling drum 5 also provided with recesses 5a to receive cigarette units. Each recess 5a communicates with a passage 5b, in which a vacuum is maintained to hold the cigarette units on the periphery of the drum. The recesses 5a are somewhat shallower than corresponding recesses 3a on the transfer drum, so as to make it easier for the rolling mechanism to begin to roll a cigarette unit out of one of the recesses 5a. Preferably, the depth of each recess 5a is about 0.015". This depth is exaggerated in the drawing, for purposes of clarity. As the cigarette unit with attached patch 8 approaches the top of the rolling drum 5, it encounters the rolling shoe 6 which comprises an initial unheated section 6a separated by an insulating spacer 6b from a heated rolling section 6c. The section 6c and the opposite end of the shoe are separated by another heat insulating spacer 6d from a third, unheated rolling shoe section 6e.

The heated shoe section 6c is somewhat narrower than the unheated sections 6a and 6e, being just slightly wider than the patch 8 which it is intended to heat. The section 6c is flanked on either side by another unheated section (not shown), so that the entire length of the cigarette unit is rolled evenly, while only the patch 8 is subjected to heat.

The bottom of the shoe 6 is provided with a plurality of ridges 6g, extending parallel to the axis of rotation of drum 5. The ridges 6g are spaced apart along the arcuate surface of the shoe 6, so that the central angle at the axis of drum 5, between radii drawn to the centers of successive ridges, is equal to the central angle between the centers of successive recesses 5a. The ridges 6g project from the surface of shoe 6 by a distance slightly than the depth of a recess 5a. The purpose of each ridge 6g is to engage the periphery of a passing cigarette resting in one of the recesses 5a, and start it rolling out of that recess, and between the periphery of the drum 5 and the arcute surface of the shoe 6.

The ridges 6g are preferably provided with angular edges, as shown, to give them a good grip on the peripheries of passing cigarette units.

Each cigarette rolling between the shoe 6 and drum 5 moves at one-half the peripheral speed of drum 5. Hence, there are twice as many cigarettes under the shoe 6 as there are recesses 5a, at any given time.

The first ridge 6g is at the leading edge of the shoe section 6a, and the locations of the others are determined by the angular relationship described above. With this spacing of the ridges, each time that a cigarette falls into a recess 5a, it soon thereafter encounters a ridge effective to roll it out of that recess. The spacers 6b and 6d may either be of solid, heat insulating material, or may simply be an air space, which has adequate heat insulating qualities for the purpose. Where an air space is used, the ends of the cigarette unit, being rolled between the drum and the unheated sections of the shoe 6, keep the cigarette rolling as it crosses the gap at the spacers 6b and 6d.

The shoe 6 is separated from the periphery of drum 5 by a distance slightly less than the diameter of a cigarette unit, so that when the cigarette unit 11 encounters the initial shoe section 6a, it is rolled out of its associated recess 5a by ridge 6g as shown in FIG. 8. The vacuum in the passage 5b is released at the same time, by conventional means. The peripheral length of the section 6a is sufficient so that when the cigarette reaches the end of section 6a, it has rotated more than one half revolution, and the tack at its leading edge has passed beyond the point of contact with the rolling shoe 6. (See FIG. 7.) After passing the insulating section 6b, the cigarette unit encounters heated shoe section 6c, which is effective to roll the cigarette through a plurality of revolutions, at the same time heating the cigarette and making the bonding material on the inner surface of the patch tacky so that it sticks to the cigarette rod section and the filter section. During this heating, the cigarette unit is always firmly held between the drum 5 and the shoe 6, so that the patch cannot come loose. After the cigarette unit passes the heater section 6c of the rolling shoe, it then passes the insulator section 6d of the cooling section 6e, where the cigarette is further rolled for a plurality of revolutions.

At the cooling shoe section 6e, the heat-activatable material is set by the cooling action of the shoe. At the point where the cigarettes pass from the cooling section 6e, the vacuum is again restored to the passages 5b, so that the cigarettes are held by the vacuum in the nearest groove 5a and pass to further manufacturing operations, which commonly include cutting each unit into two individual cigarettes 13, as shown at the bottom of FIG. 2.

I claim:
1. The method of making a filter tip cigarette from a cigarette unit including a section of cigarette rod, a section of filter rod having one of its ends abutting an end of the cigarette rod and a patch of sheet material coated with heat-activatable bonding material and bonded along one of its edges to said unit so as to span the abutting rod ends, wherein the improvement comprises:
   (a) rolling said unit while unheated, through a partial revolution to wrap the sheet material partially about the unit;
   (b) rolling said unit through a plurality of revolutions while applying heat to the exterior thereof to complete the wrapping and bond the sheet material to the rod sections; and
   (c) rolling said unit through a further plurality of revolutions while unheated to set the bonding material.

2. The method of making a filter tip cigarette from a section of cigarette rod and a section of filter rod having one of its ends abutting an end of the cigarette rod, wherein the improvement comprises:
   (a) heating a patch of tipping material coated with heat-activatable bonding material;
   (b) applying one edge of the patch to an assembled cigarette rod section and filter rod section so that the edge of the patch spans the abutting rod ends and adheres to the rod sections;
   (c) cooling said patch, thereby setting the adhesive along said edge to form a cigarette unit;
   (d) rolling said unit while unheated, through a partial revolution to wrap the patch of tipping material partially about the unit;
   (e) rolling said unit through a plurality of revolutions while applying heat to the exterior thereof to complete the wrapping and bond the tipping material to the rod sections; and
   (f) rolling said unit through a further plurality of revolutions while unheated to set the bonding material.

References Cited

UNITED STATES PATENTS 3,091,245   5/1963   Rudszinat et al. _____ 131—94
3,094,128   5/1963   Dearsley _____ 131—94

FOREIGN PATENTS 1,046,489   10/1966   Great Britain.

SAMUEL KOREN, Primary Examiner

J. H. CZERWONKY, Assistant Examiner